United States Patent [19]

Torres et al.

[11] B 3,985,613
[45] Oct. 12, 1976

[54] REACTOR TRIP ON TURBINE TRIP INHIBIT CONTROL SYSTEM FOR NUCLEAR POWER GENERATING SYSTEM

[75] Inventors: Jose Marcelo Torres, Simsbury; Charles Ronald Musick, Vernon, both of Conn.

[73] Assignee: Combustion Engineering, Inc., Windsor, Conn.

[22] Filed: July 31, 1973

[21] Appl. No.: 384,330

[44] Published under the second Trial Voluntary Protest Program on January 27, 1976 as document No. B 384,330.

[52] U.S. Cl................................ 176/20 R; 176/37
[51] Int. Cl.² ........................................ G21C 19/00
[58] Field of Search........................... 176/37, 38, 20

[56] References Cited
UNITED STATES PATENTS

| | | | |
|---|---|---|---|
| 3,425,903 | 2/1969 | Bevilacqua | 176/20 |
| 3,671,390 | 6/1972 | Hogle | 176/20 |
| 3,791,922 | 2/1974 | Musick | 176/20 |

*Primary Examiner*—Verlin R. Pendegrass
*Assistant Examiner*—P. A. Nelson
*Attorney, Agent, or Firm*—Stephen L. Borst

[57] ABSTRACT

A reactor trip on turbine trip inhibit control system for a nuclear power generating system which utilizes steam bypass valves. The control system inhibits a normally automatic reactor trip on turbine trip when the bypass valves have the capability of bypassing enough steam to prevent reactor trip limits from being reached and/or to prevent opening of the secondary safety pressure valves. The control system generates a bypass valve capability signal which is continuously compared with the reactor power. If the capability is greater than the reactor power, then an inhibit signal is generated which prevents a turbine trip signal from tripping the nuclear reactor.

10 Claims, 4 Drawing Figures

REACTOR TRIP ON TURBINE TRIP INHIBIT CONTROL SYSTEM FOR NUCLEAR POWER GENERATING SYSTEM

BACKGROUND OF THE INVENTION

This invention relates to a control system for a nuclear reactor and more particularly to a control system for preventing unnecessary reactor trips.

The principles for the generation of power by a nuclear reactor have been well established and are well understood. Briefly, the reactor contains uranium or plutonium fuel elements in a core arrangement. Through the mechanisms of neutron absorption and nuclear fission of the uranium or plutonium large amounts of energy are released. This released energy manifests itself in the form of heat which is utilized to generate electricity. In the pressurized water reactor context, the heat is transferred to a primary coolant which continuously circulates through the core and carries the generated heat to a heat exchange boundary where a secondary coolant or working fluid is heated. Ordinarily the secondary coolant is water and is vaporized at the heat exchange boundary to produce steam. The steam is then circulated in a secondary system to a turbine for its ultimate use. The turbine is caused to turn at a predetermined rate and is connected to a generator for the ultimate transformation of the thermal energy into electrical energy.

All elements of this system are functionally interrelated. As an example, an increase in reactor power increases the rate of energy transfer to the primary coolant which in turn increases the rate of energy transfer to the secondary coolant causing more energy provided to the turbine for its ultimate transformation into electrical energy. Conversely, if less electrical energy is required, the energy requirements of a turbine diminsh. The steam flow to the turbine is reduced and consequently the turbine utilizes less of the thermal energy being transferred to the secondary coolant and an energy backup results. Since less energy is being drawn from the steam supply system when the steam flow is reduced, both the temperature and pressure of the steam generator secondary side are caused to increase. The effect of this increase in secondary coolant temperature is reflected on the primary side of the heat exchanger since less energy can be transferred across the heat exchange boundary. Accordingly, both the primary coolant temperature and pressure increase. This trend continues until the reactor regulating system, which is programmed to keep the average temperature of the primary coolant on a specified program, returns the system to acceptable values by cutting back on the reactor's power by driving regulating rods into the core.

Since the regulating rods can only be slowly advanced into the core at a limited maximum speed, the reactor regulating system is unable to prevent a serious increase in primary and secondary pressures and temperatures if the magnitude and rate of energy backup described above exceeds certain values. Among other things, energy backup is dependent on the magnitude and rate of decrease in turbine load: called a turbine load rejection. Ordinarily, the reactor and steam supply systems are designed to be able to withstand a predetermined load rejection and rate of the load rejection. However, if the actual load rejection or rate of load rejection exceed these predetermined values, the reactor regulating system is unable to compensate rapidly enough for the energy backup and the temperatures and pressure of the primary system may increase uncontrollably. When this occurs, protective systems come into operation to trip the reactor and/or to open steam relief valves in order to avoid an overpressurization of primary and secondary systems. If the uncontrolled increase in pressure is not avoided by these measures, the safety pressure valves of either the primary or the secondary side are caused to lift. This is an undesirable occurrence since it may put the sytem out of operation until the seals of the safety valves have been remachined and reseated.

At this point it should be noted that the protective systems normally include both reactor protective systems and equipment protective systems. The reactor protective systems are designed to trip the reactor in the event certain limits are exceeded in the primary system such as too high of a primary pressure or too low of a DNBR. There are safety trips in the sense that they are required-to-insure only safe operation of the reactor. On the other hand, the equipment protective systems are designed to trip the reactor to prevent plant equipment damage. An example of such an equipment protective trip is the reactor trip on turbine trip, the rationale being that such an occurrence would normally result in the safety pressure valves eventually lifting and one of the reactor protective trip limits (usually high primary pressure) eventually being exceeded. In other words, the reactor is tripped at an early stage since such a reactor shutdown is eventually expected and since plant equipment damage (lifting of the safety pressure valves) can be prevented.

However, tripping the reactor unnecessarily is undesirable since it temporarily removes the nuclear power plant as a supplier and a time-consuming and therefore expensive reactor startup procedure must be followed before the reactor can be put back into operation as a power producer.

Systems have been devised to prevent overpressurization in the primary and secondary systems in the event of large or rapid load rejections. One such system is disclosed in copending application Ser. No. 347,260 filed Apr. 2, 1973 entitled "Steam Relief Valve Control System for a Nuclear Reactor" by Jose Marcelo Torres, assigned to the same assignee as the present invention. That application deals with the use of steam relief valves operable in response to rises in secondary system pressure to bypass excess steam to the condenser or to dump steam to the outside atmosphere. Therefore, by using a plurality of steam relief valves which are operable to prevent overpressurization in the primary and secondary systems, it is no longer absolutely necessary to trip the reactor everytime the turbine is tripped.

SUMMARY OF THE INVENTION

Accordingly, the present invention involves the concept of inhibiting a reactor trip on turbine trip only when the coolant vapor relief means of the system has the capability to prevent the reactor protective trip limits from being exceeded. More particularly, in a nuclear power generating system which includes a nuclear reactor, a turbine for receiving coolant vapor, coolant vapor relief means for diverting coolant vapor from the turbine, and a protective system independently responsive to a plurality of signals to cause the reactor to trip, each of these signals being indicative of the occurrence of a turbine trip or the occurrence of one of a series of interrelated events, the present invention discloses apparatus and a method for inhibiting the protective system from tripping the reactor when the turbine is tripped only when the coolant vapor relief means is capable of diverting enough coolant vapor to prevent the occurrence, as a result of a turbine trip, of one of the interrelated events.

Stated more particularly the invention involves determining the capability of coolant vapor relief valves, measuring the reactor power, and continuously comparing the capability of the coolant vapor relief valves with the reactor power. An inhibit signal is then generated only when the capability of the valves is greater than the reactor power. The inhibit signal acts to prevent the protective system from responding to a turbine trip signal to trip the reactor.

In this way the reactor will not be tripped unnecessarily. If the nuclear steam generating system is able to accommodate a turbine trip at a given power level without causing one of the reactor trip limits to be exceeded or without causing weeping or lifting of safety pressure valves, then the reactor is allowed to stay on line. If on the other hand some of the coolant vapor relief valves are out of service or otherwise not able to divert coolant vapor automatically, and if a turbine trip cannot be accommodated, then the reactor is allowed to trip automatically on a turbine trip. The on-line reactor power is used in making the continuous comparison with the capability of the coolant vapor relief valves since the power generated at this power level is equivalent to the amount of power which will have to be relieved should a turbine trip occur.

It is to be noted that the capacity of the coolant vapor relief valves is not necessarily equivalent to the capability of the valves. The capacity refers to the quantity or amount of coolant vapor which can be diverted through the valves. On the other hand, the capability refers to the ability of the valves to divert enough vapor to relieve the energy backup to prevent one of the reactor trip limits from being exceeded and/or to prevent the weeping or lifting of safety pressure valves. Generally speaking, and as previously noted, the reactor and steam supply systems are designed to be able to withstand a predetremined load rejection and a rate of load rejection. This represents a cushion which is inherent within the systems and which is included in determining the capability of the coolant vapor relief valves. Accordingly, the capability of the coolant vapor relief valves is equivalent to the capacity of the valves increased by an amount which is equal to the inherent capability within the system to handle a load rejection and rate of load rejection without causing one of the reactor protective trip limits to be exceeded and/or opening of safety pressure valves.

DESCRIPTION OF THE PREFERRED EMBODIMENT

Figure 1:
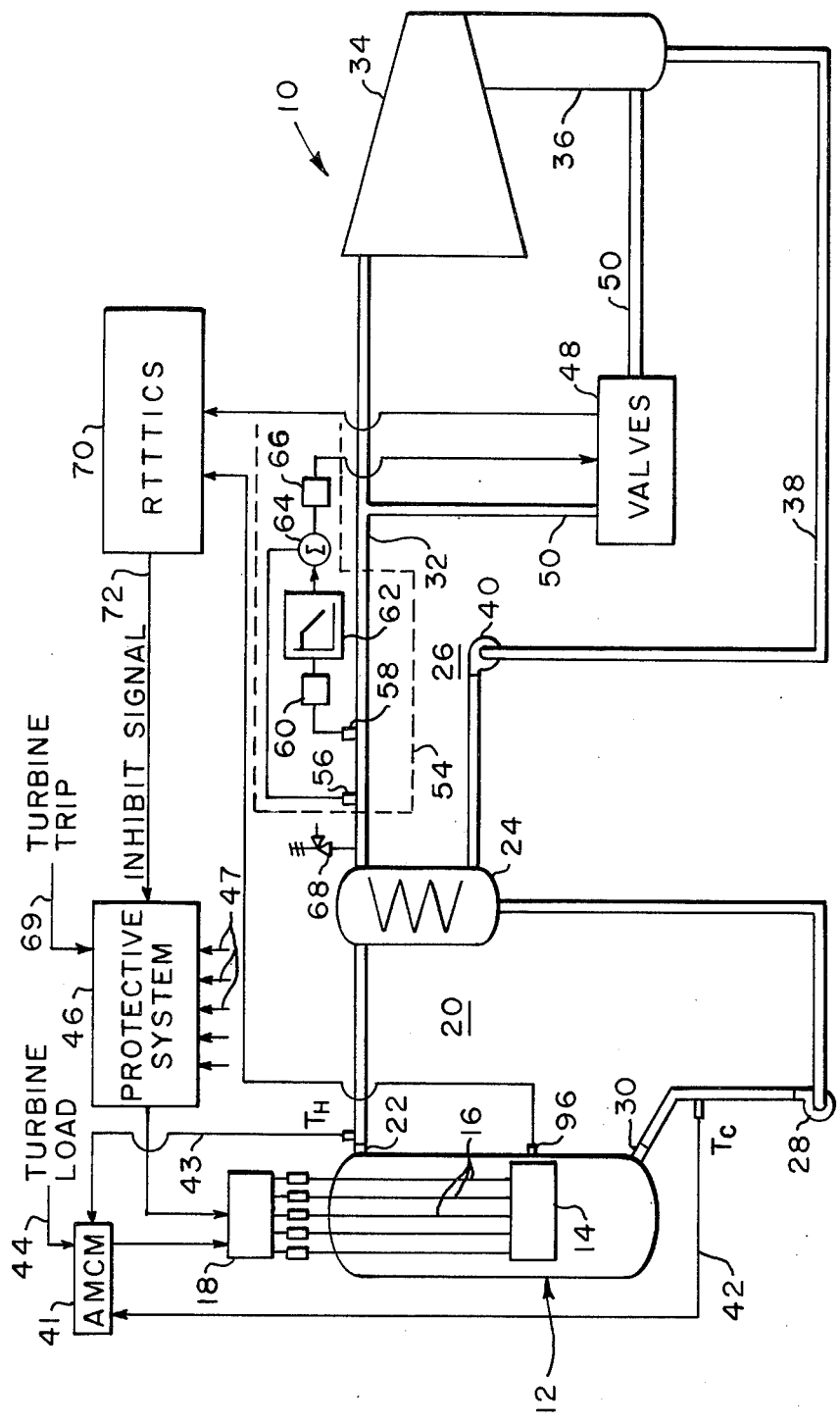
FIG. 1 is a schematic diagram of a nuclear power generating system which incorporates the reactor trip on turbine trip inhibit control system of the present invention.

Referring now to the drawings, FIG. 1 shows a pressurized water reactor power generating system 10 in which the present invention is incorporated. However, this should not be taken as inferring a limitation on use of the present invention as the invention is equally applicable to other nuclear power generating systems. The nuclear power generating system 10 includes a nuclear reactor vessel 12 having a core 14 which is controlled by control elements 16 which penetrate the shell of the reactor vessel 12. The control elements 16 are actuated to be driven into and out of the core 14 by driving means 18. The reactor 12 and core 14 are cooled by a primary coolant system (generally indicated by 20) which provides a continuous flow of primary coolant to and from the reactor vessel 12. The coolant exits the reactor 12 at exit nozzle 22 and is circulated to a heat exchanger 24 where the coolant gives up its heat to a secondary coolant system (generally indicated by 26). After passing through the heat exchanger 24, the primary coolant is returned to the reactor 12 through pump 28 and inlet nozzle 30. The heated secondary coolant, which is usually water, is caused to pass in its vapor form through pipe 32 of the secondary coolant system 26 to the turbine 34. After passing through the turbine 34 the vapor or steam is quenched in condenser 36 and eventually returned through pipe 38 by a feedwater pump 40 to the heat exchanger 24.

Normally the power level of the reactor 12 and the load on the turbine 34 are maintained to be in agreement. That is, the turbine 34 is caused to accept steam at a rate which is commensurate with the reactor power level so that the energy transferred from the primary coolant system 20 to the secondary coolant system 26 is completely utilized by the turbine 34. To maintain this agreement between reactor power level and turbine load an automatic motion control means 41 is provided which controls the average reactor coolant temperature ($T_{AVG}$) to a desired value determined according to the turbine load. The automatic motion control means 41 controls the driving means 18 in response to input signals 42, 43 and 44 to lower and raise the power level. The input signals 42, 43 and 44 are indicative of the primary inlet coolant temperature ($T_C$), the primary exit coolant temperature ($T_H$) and the turbine load respectively. Of course, when $T_{AVG}$ is held steady, a balance exists between the reactor power and the turbine load.

The automatic motion control means 41, however, can only slowly move the control elements 16 within the core 14 to change the reactor power, the rate of power change generally being limited to the order of 5 percent per minute. Accordingly, for large turbine load reductions the reactor 12 cannot radidly follow the turbine 34 which may result in an energy back-up in the secondary coolant system 26. This in turn may cause the pressure and temperature of the coolant in the primary coolant system 20 to increase. These increases, if not compensated for, will eventually cause safety limits on reactor operation to be exceeded and a protective system 46 will trip or shutdown the reactor 12 by dropping the control elements 16 into the core 14.

This takes place automatically upon receipt of a signal 47 indicative of one of several functionally interrelated limits being exceeded. For example, such limits might be too high of a primary pressure or too low of a DNBR. For large turbine load reductions, normally it is the high primary pressure limit which is exceeded.

Figure 2:
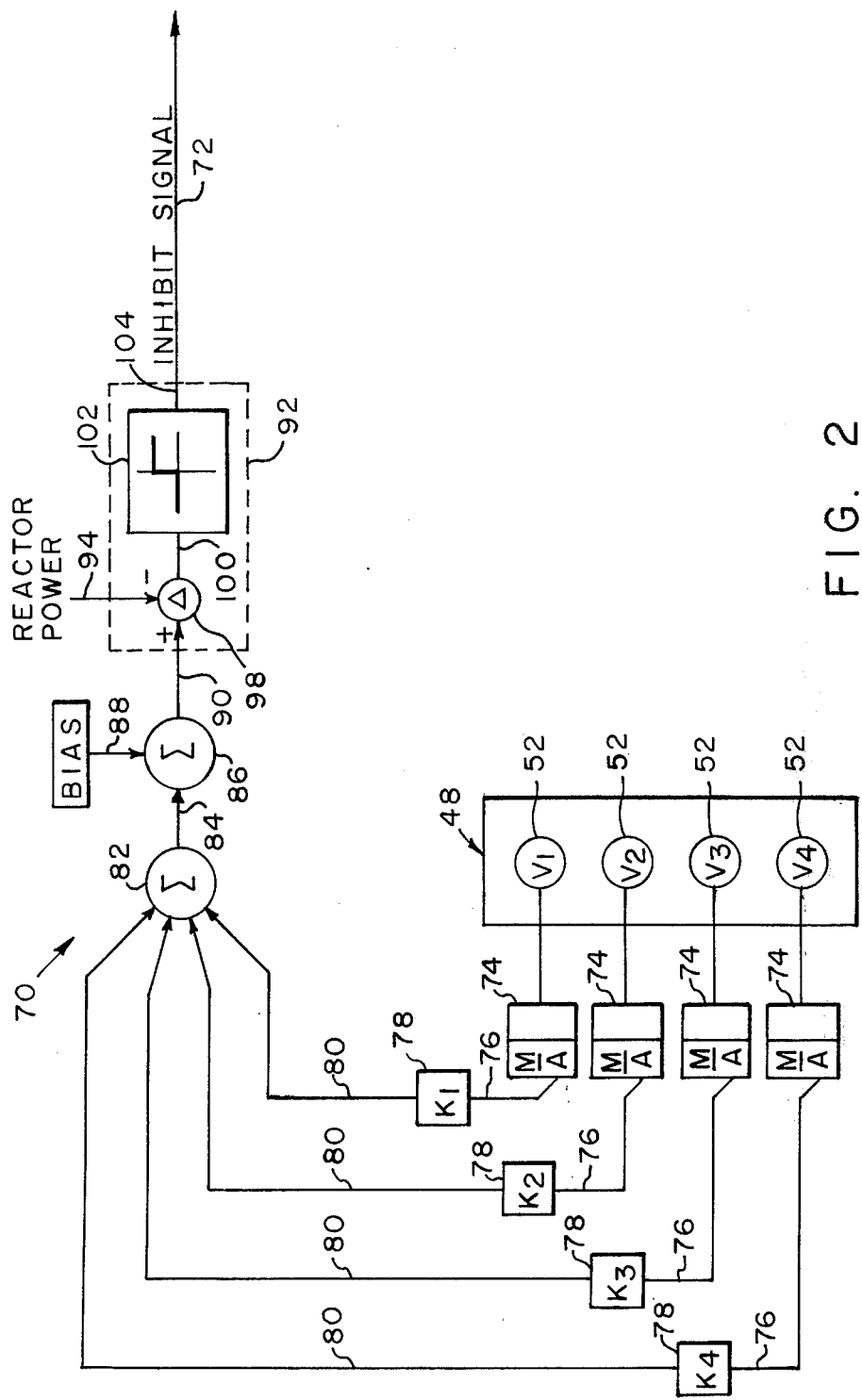
FIG. 2 is a schematic circuit diagram of the reactor trip on turbine trip inhibit control system of FIG. 1.

To aid in preventing excessive energy build-up in the secondary coolant system 26, the nuclear power generating system 10 of FIG. 1 is provided with a coolant vapor relief valve system 48. More particularly, the coolant vapor relief system 48 is a bypass valve system located in bypass conduit 50 for bypassing coolant vapor or steam from the turbine 34 directly to the condenser 36. However, it should be noted that the coolant vapor relief system 48 could also be designed to pass the steam in pipe 32 directly to the atmosphere or to both the condenser 36 and the atmosphere. As shown in FIG. 2, the bypass valve system 48 is comprised of a plurality of individual valves 52. The valves 52 are arranged in parallel fashion as opposed to a series arrangement in the bypass conduit 50 so that if one of the valves 52 is inoperative, it will not cause the whole system 48 to be inoperative. In the event of an energy back-up in secondary coolant system 26, the valve system 48 is controlled automatically by a control system 54 to relieve the energy build-up in secondary coolant system 26 to prevent pressure and temperature increases in the primary and secondary coolant systems 20 and 26.

The particular bypass valve control system 54 shown in FIG. 1 for automatically controlling the bypass valve system 48 corresponds to the control system disclosed in previously noted copending application entitled "Steam Relief Valve Control System for Nuclear Reactor." It comprises a pressure sensor 56, coolant flow sensor 58, lagging means 60, pressure set point programmer 62, summation means 64, and valve controller 66. The operation of the control system 54 is as follows. Secondary coolant flow sensor 58 detects the secondary coolant flow to the secondary coolant system 26, the steam flow being used as the power index for the secondary system. The sensor 58 generates a signal commensurate with the secondary coolant flow which is in turn commensurate with the power of the system 10 and transmits this signal to a lagging means 60 which causes the transmission of the signal to be lagged. After the signal has been lagged, the signal from lagging means 60 is transmitted to the pressure setpoint programmer 62 which has been pre-programmed to generate a pressure setpoint signal which varies according to the magnitude of the power input signal.

Figure 4:
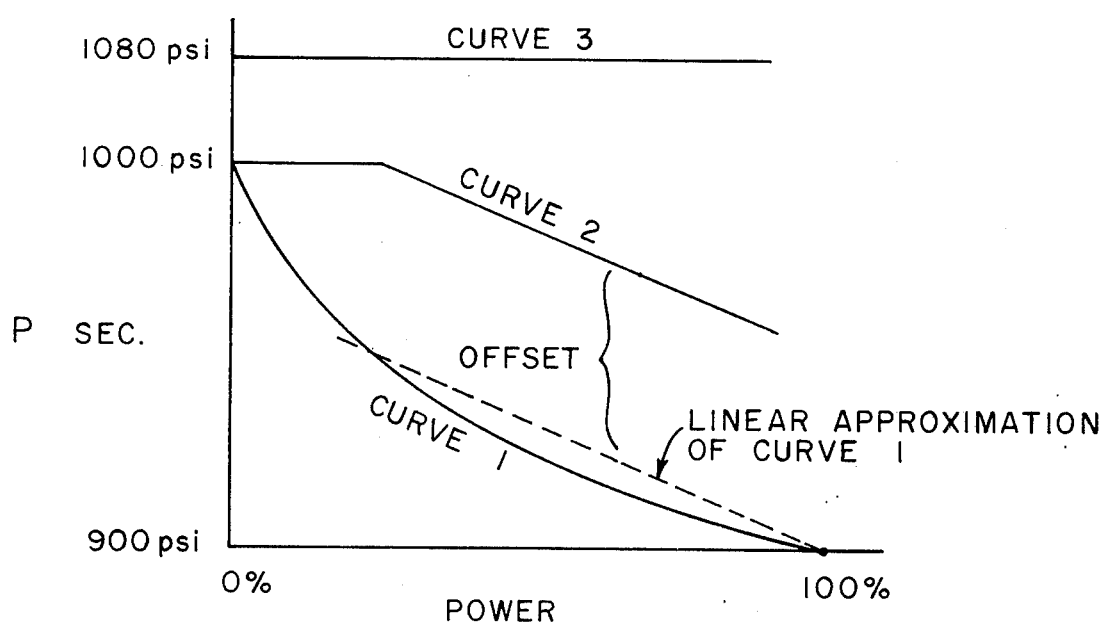
FIG. 4 is a plot of (1) the steady state curve of power vs. secondary pressure, (2) a variable secondary pressure set point curve for automatic operation of the bypass valve system, and (3) the predetermined pressure limit for opening of the secondary safety pressure valves.

Although any one of a variety of pressure setpoint programs could be used, the preferred program can be seen as curve 2 in FIG. 4. Curve 2 has been derived in advance by linearly approximating part of the steady state secondary pressure vs. power curve of Curve 1. It has been then displaced or biased by a pressure increment equivalent to the pressure jump to be expected from a 10 percent turbine load rejection. For values of flow indicative of a load less than about 20 percent of the full load, Curve 2 is horizontal and has a value of 1000 psi which is representative of the secondary pressure that is maintained in the secondary coolant system 26 during hot standby when the load is zero. Next, the pressure setpoint, which lies somewhere along Curve 2 of FIG. 4, depending on the power, is transmitted to the summation point 64. At the summation point 64 the pressure setpoint is compared to the actual pressure of the secondary coolant system 26 which has been detected by the detector 56 and transmitted to the summation point 64. Summation point 64 then generates and transmits a pressure error signal which causes the controller 66 to actuate the valves 52 of bypass valve system 48 to bring the secondary pressure down to its setpoint value.

The control system is continuously operative and therefore modulates the valves 52 of the bypass valve system 48 so as to maintain the secondary pressure at a value long the setpoint program. As the program of the reactor 12 is brought into agreement with the turbine load, the bypass valves 52 will close and only when all of the valves 52 are closed will the secondary pressure drop back down to fall somewhere along Curve 1. Of course, other control systems which may or may not operate on a 10 percent load reduction for automatically modulating the bypass valve system 48 could be used and accordingly the present invention is not meant to be limited to the use of the particular control system described herein.

It should be noted that if the bypass valve system 48 cannot control the energy buildup in the secondary coolant system 26, then secondary side safety pressure relief valves 68 may be caused to lift or open to provide an energy balance between the primary and secondary systems 20, 26. These safety pressure valves 68 are provided in pipe 32 and are designed to lift or open when the secondary coolant pressure exceeds a predetermined value. Curve 3 of FIG. 4 is representative of a typical predetermined pressure limit which may be used. The lifting or opening of the safety pressure valves 68 does not in and of itself cause the protective system 46 to trip the reactor 12 since the power balance may be reached at a primary coolant pressure which is below the pressure trip limit. Other trip limits may or may not then be reached depending on the reactor power level. If other trip limits are not reached and if other shutdown measures are not taken, the reactor would continue to operate at the elevated power level.

Each of the valves 52 is operative in an automatic mode and a manual mode, (designated as "A" and "M" respectively) the automatic mode denoting that the valve 52 is subject to automatic operation in the event of an energy back-up in the secondary coolant system 26. The number of valves 52 which comprise the valve system 48 and the capacities of each to bypass the steam may vary depending on the total number and capacity desired. With the embodiment shown in FIG. 2 four valves 52 are used and are identified as $V_1$, $V_2$, $V_3$ and $V_4$. If, for example, 85 percent total capacity is desired for the valve system 48, then one of the valves 52 may have 25 percent capacity and the remaining three be of 20 percent capacity each. The capacity of a valve 52 refers to the quantity of steam which may be passed therethrough and may be represented as a percent of power, since the power of the reactor 12 and the turbine load are related to the rate of coolant flow in the secondary coolant system 26. Generally, as is apparent hereinbelow, it is desirable to have as many valves 52 as possible since inoperation of one valve will not significantly decrease the capacity of the system 48. For example, the system could include 8 valves of 10 percent capacity each and one valve of 5 percent capacity to achieve an 85 percent total capacity for the system 48.

Turning now to the protective system 46, in addition to being independently responsive to plurality of signals 47 indicative of the reactor safety limits being exceeded, the protective system 46 is also responsive to a turbine trip signal 69 to trip the reactor 12. The rationale behind this procedure is that with a turbine trip, the safety limits for reactor operation will most likely be exceeded and/or the secondary safety pressure valves 68 be caused to open. Since such occurrences will shut the reactor 12 down, and/or unseat the secondary safety pressure valves 68, it is best to shut the reactor 12 down prematurely. This is an equipment protective trip as opposed to a safety trip in the sense that it is designed to prevent damage to plant equipment, while not being relied upon to assure reactor safety.

In view of a bypass valve system 48 being provided, it is no longer absolutely desirable and necessary to provide for a reactor trip on turbine trip. A turbine trip may result for a number of reasons, some of which are temporary in nature and some of which will require extensive repair. In the temporary situations, such as the plant 10 being separated from the electrical network grid, the reason for the turbine trip can often be quickly remedied and accordingly the turbine 34 can be brought back quickly into operation. In such a situation it is highly desirable to prevent a reactor trip.

Accordingly, a reactor trip on turbine trip inhibit control system 70 has been provided for the nuclear power generating system 10 of FIG. 1. The reactor trip on turbine trip inhibit control system 70 is designed to first determine the capability of the bypass valve system 48 and then compare this with the reactor power. If the capability is as great as or greater than the reactor power, a reactor trip on turbine trip inhibit signal 72 is generated which acts to prevent the protective system 46 from responding to a turbine trip signal 69. In this way, a reactor trip on turbine trip will not occur unnecessarily. The reactor 12 is allowed to trip in the event of a turbine trip only when the bypass valve system 48 cannot prevent reactor safety limits being exceeded and/or opening of the safety pressure valves 68.

It is to be noted that it is not desirable to permanently prevent a reactor trip on turbine trip when the bypass valve system 48 is designed to accommodate a full load rejection (i.e. 100 percent load rejection) since some of the bypass valves 52 may be inoperative due to repair work being performed or being damaged. Also, some of the valves 52 may have been placed in the manual mode (M) and may not have been returned to the automatic mode (A).

The schematic circuit diagram for the reactor trip on turbine trip inhibit control system 70 can be seen in FIG. 2. The system first determines the capacity of the available bypass valves 52 to bypass steam in the event of a turbine load reduction. Each of the control mode selectors 74 associated with the valves 52 generates an availability signal 76 if the selector 74 is in the automatic mode (A). The availability signals 76 are then transmitted to associate multipliers 78 which weight or bias the availability signal 76 to generate an individual capacity signal 80. The weighting factors $K_1$, $K_2$, $K_3$ and $K_4$ applied by the multipliers 78 correspond to the relative capacities in terms of percent power for the associated valves 52 identified as $V_1$, $V_2$, $V_3$ and $V_4$ respectively. The individual capacity signals 80 for the valves in the automatic mode are then transmitted to a capacity summation means 82 where the individual capacity signals 80 are summed to produce a total capacity signal 84 for the available valves. It should be noted that if any valves 52 are in the manual (M) mode, then no availability signal will be generated for those valves and accordingly no individual capacity signal will be generated. If the valves 52 are inoperative due to repair or damage the associated control mode selector 74 will be placed in the M position.

The total capacity signal 84 is then transmitted to a capability summation means 86 where a biasing signal 88 is added to the capacity signal 84 to produce a capability signal 90 which is commensurate with the capability of the bypass valves 52 to accommodate a turbine load rejection. As noted hereinabove, the capability of the bypass valves 52 refers to the ability of the bypass valve system 48 to bypass coolant vapor to relieve the energy back-up in the secondary coolant system 26. The biasing signal 88 is representative of the inherent ability of the nuclear power generating system 10 to accommodate a load rejection. Consistent with the example hereinabove, the biasing signal 88 is equivalent to 15% power and represents the fact that the nuclear power generating system is capable of withstanding a turbine trip from a power level approximately 15 percent greater than the capacity of the bypass valve system 48 without exceeding parameter operational limits. Accordingly, by providing for 85 percent capacity of the bypass valve system 48, the system can withstand a 100 percent load rejection. Although in the above example the biasing signal 88 is constant, it is apparent that it may be variable depending, for example, on whether the reactor 12 is being controlled manually or automatically, or depending on the control element worth, time in fuel life, or power level.

The capability signal 90 is then transmitted to a comparator 92 where it is continuously compared with the reactor power signal 94. The reactor power signal 94 may be generated in a variety of ways. For the embodiment shown in FIG. 1 a neutron flux detector 96 is situated external to the core 14 and generates a signal which is commensurate with the neutron flux. This in turn approximates the reactor power. The comparator 92 for simplicity has been represented by subtraction means 98 which subtracts the power reactor signal 94 from the capability signal 90 and generates a corresponding difference signal 100. If the difference signal 100 is positive, the binary signal generator 102 generates a binary 1 signal 104. Such a signal 104 is indicative of the capability of the bypass valve system 48 being greater than the reactor power. If the difference signal 100 is negative, the binary signal generator 102 generates a 0 signal. The resulting signal 104 is termed the capability-greater-than-power signal and for the embodiment shown in FIG. 2, is the reactor trip on turbine trip inhibit signal 72 which is transmitted to the protective system 46.

The inhibit signal 72 operates to prevent response by the protective system 46 when and if a turbine trip signal 69 is transmitted thereto. This may be accomplished in a variety of well-known ways. For example, the inhibit signal 72 could actuate a relay switch to interrupt the turbine trip signal 69 and thus prevent it from tripping the reactor 12.

Accordingly, a reactor trip may be prevented in the event of a turbine trip when the bypass valve system 48 has the capability of preventing the occurrence of one of the safety trip limits being exceeded as a result of the turbine trip. It should be noted that it is the occurrence of one of the interrelated events as a result of a turbine trip which is to be prevented and not the occurrence of the event in general. If one of the events (i.e. the safety trip limits) occurs for some reason other than as a result of a turbine trip, the reactor 12 will be tripped. Also the reactor trip on turbine trip is inhibited when the bypass valve system 48 is capable of preventing the safety pressure valves 68 from opening. As previously noted, the coolant vapor relief valve system 48 may be arranged to pass the steam in pipe 32 directly to the condenser 36 or to dump the steam to the atmosphere. Often, when the steam is to be bypassed to the condenser 36 the condenser equipment manufacturer may require that a condenser interlock be provided for safety and equipment protection. In effect, the condenser interlock prohbits opening of the bypass valves 52 to dump steam into the condenser 36 except when it can be assured that the condenser 36 can handle the bypassed steam without causing damage to the condenser 36 or turbine 34. For example, the limitation may be imposed that the bypass valves 52 can only open if a condenser vacuum exists which is indicative of the condenser 36 being able to dissipate the energy of the steam delivered thereto. Also, other limitations may be imposed before the condenser 36 is available. Accordingly, if the bypass valves 52 cannot open to bypass steam, it is of no benefit to prevent a reactor trip on turbine trip.

Figure 3:
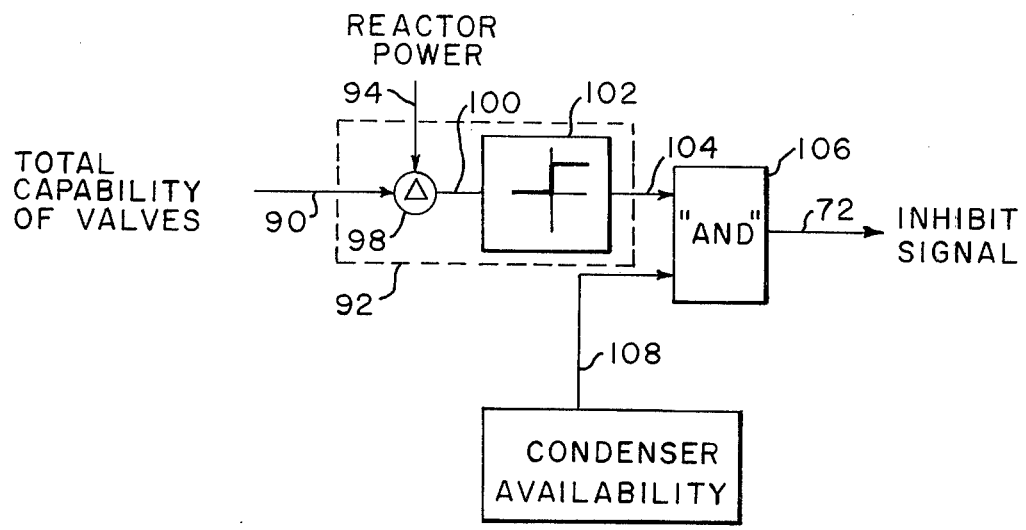
FIG. 3 is a schematic circuit diagram of an alternative arrangement for the control system of the present invention in which a condensor interlock is used.

FIG. 3 shows a modified schematic circuit diagram for the control system 70 which is particularly applicable to impose condenser availability limitations. As with the embodiment of FIG. 2, a capability signal 90 is generated and transmitted to the comparator 92 for continuous comparison with a reactor power signal 94. The signal generator 102 of the comparator then generates a binary 1 signal 104 only when the capability of the bypass valve system 48 is greater than the reactor power. This binary capability-greater-than-power signal 104 is then transmitted to an "AND" gate 106. The "AND" gate 106 is also responsive to a condenser availability signal 108 which is indicative of the condenser 36 being available to receive bypassed steam and accordingly indicative of the bypass valves 52 in the automatic mode being able to be open in the event of a turbine load reduction. The "AND" gate 106 will produce a reactor trip on turbine trip inhibit signal 72 only if both the capability-greater-than-power signal 104 and the condenser availability signal 108 are present. This inhibit signal 72 is then transmitted as before to the protective system 46 where it will inhibit response by the protective system 46 to a turbine trip signal 69.

Accordingly, the present invention discloses the concept of inhibiting a reactor trip on turbine trip when the bypass valves 52 in the nuclear power generating system 10 have the capability to prevent reactor trip limits from being exceeded and/or to prevent opening of the safety pressure valves 68. In particular the control system 70 first determines the capacity of the bypass valves 52 which are available to bypass steam in the event of a turbine load reduction. A biasing signal 88, which is indicative of the inherent ability of the power generating system 10 to accommodate a load rejection, is then added to the capacity signal 84 to produce a capability signal 90. This capability signal 90 is continuously compared with the reactor power signal 94 and an inhibit signal 72 is generated only when the capability of the bypass valves is greater than the reactor power. In some instances, the inhibit signal 72 will only be produced if both a capability-greater-than-power signal 104 and a condenser availability signal 108 exist. The inhibit signal 72 then acts to prevent the protective system 46 from responding to a turbine trip signal 69 to trip the reactor 12.

This invention may be practiced with the electrical portions of the control system embodied an analog control circuitry or as digital control circuitry. When digital hardware is employed, a programmed digital process computer can be included in the control circuitry. The use of such circuitry for the electrical portions of control systems is well known in the art and accordingly it is not deemed necessary to detail such circuitry herein.

It will be understood that the embodiments shown and described herein are merely illustrative and that changes may be made without departing from the scope of the invention as claimed.

What is claimed is:

1. A nuclear power generating system comprising:
   coolant vapor generating apparatus including a nuclear reactor;
   a turbine for receiving coolant vapor produced by said vapor generating apparatus;
   coolant circuitry for said coolant vapor generating apparatus and said turbine including means for delivering vapor to said turbine;
   a plurality of coolant vapor relief valves in said coolant circuitry, at least one of said valves being operable automatically to divert coolant vapor from said turbine;
   a protective system independently responsive to a plurality of signals to cause said nuclear reactor to trip, at least one of said signals being indicative of the occurrence of a turbine trip;
   means responsive to the power of said nuclear reactor for producing a power signal commensurate with the power of said nuclear reactor;
   means for producing a capability signal commensurate with the capability of said coolant vapor relief valves to divert coolant vapor;
   means responsive to a plurality of inputs including said power signal and said capability signal for producing an inhibit signal only when the capability of said coolant vapor relief valves is greater than the power of said nuclear reactor; and
   means responsive to said inhibit signal for preventing said protective system from responding to a signal indicative of a turbine trip.

2. The power generating system of claim 1 wherein said means for producing said capability signal comprises:
   means for producing a total capacity signal commensurate with the power level corresponding to total capacity of said coolant vapor relief valves which are operable automatically to divert coolant vapor;
   means for producing a biasing signal commensurate with the inherent capability of the power generating system to accommodate a turbine load rejection; and
   means responsive to said total capacity signal and said biasing signal for summing said total capacity signal and said biasing signal to produce said capability signal.

3. The power generating system of claim 2 wherein each of said coolant vapor relief valves is operable in an automatic mode and a manual mode, and wherein said means for producing said total capacity signal comprises: means responsive to the capacity and mode of each of said coolant vapor relief valves for producing an individual capacity signal for each of said coolant vapor relief valves which is in the automatic mode, said individual capacity signals each being indicative of the capacity of its corresponding coolant vapor relief valve; and means for summing said individual capacity signals to produce said total capacity signal.

4. The power generating system of claim 3 further including a condenser coupled to the downstream side of said turbine in said coolant circuitry, wherein said coolant vapor relief valves are operable to divert the coolant vapor to said condenser, and wherein said means for producing said inhibit signal comprises:
  means responsive to said power signal and said capability signal for producing a capability-greater-than-power signal indicative of said capability signal being greater than said power signal;
  means for producing a condenser availability signal indicative of said condenser being available to accept coolant vapor diverted thereto; and
  means responsive to said capability-greater-than-power signal and said condenser availability signal for producing said inhibit signal only when said capability-greater-than-power signal and said condenser availability signal are present.

5. A nuclear power generating system comprising:
  coolant vapor generating apparatus including a nuclear reactor;
  a turbine for receiving coolant vapor produced by said vapor generating apparatus;
  coolant circuitry for said coolant vapor generating apparatus and said turbine including means for delivering vapor to said turbine;
  coolant vapor relief means in said coolant circuitry operable to cause at least some of the coolant vapor to be diverted from said turbine;
  a protective system independently responsive to a plurality of signals to cause said nuclear reactor to trip, each of said signals being indicative of the occurrence of a turbine trip or the occurrence of one of a series of interrelated events; and
  means for ihibiting said protective system from tripping said nuclear reactor when said turbine is tripped when said coolant vapor relief means is capable of diverting enough coolant vapor to prevent the occurrence as a result of a turbine trip of one of said interrelated events.

6. The power generating system of claim 5 further including safety pressure relief valves in said coolant circuitry for relieving coolant vapor pressure buildup, said safety valves being operable to open when the coolant vapor pressure exceeds a predetermined pressure limit; and wherein said inhibiting means additionally inhibits said protective system from tripping said nuclear reactor when said turbine is tripped when said coolant vapor relief means is capable of diverting enough coolant vapor to prevent the predetermined pressure limit of said safety valves from being exceeded.

7. A control subsystem for a nuclear power generating system having a reactor, a turbine for receiving coolant vapor, a plurality of coolant vapor relief valves at least one of which is operable automatically to divert coolant vapor from the turbine, and a protective system which is independently responsive to a plurality of signals to trip the reactor, at least one of the signals being indicative of the occurrence of a turbine trip, the control subsystem comprising:
  means responsive to the power of the nuclear reactor for producing a power signal commensurate with the power of the nuclear reactor;
  means for producing a capability signal commensurate with the capability of the coolant vapor relief valves to divert coolant vapor;
  means responsive to a plurality of inputs including said power signal and said capability signal for producing an inhibit signal only when the capability of the coolant vapor relief valves is greater than the power of the nuclear reactor; and
  means responsive to the presence of said inhibit signal for preventing the protective system from responding to a signal indicative of a turbine trip.

8. The control subsystem of claim 7 wherein said means for producing said capability signal comprises:
  means for producing a total capacity signal commensurate with the power level corresponding to total capacity of the coolant vapor relief valves which are operable automatically to divert coolant vapor;
  means for producing a biasing signal commensurate with the inherent capability of the power generating system to accommodate a load rejection; and
  means responsive to said total capacity signal and said biasing signal for summing said total capacity signal and said biasing signal to produce said capability signal.

9. The control subsystem of claim 8 in which each of the coolant vapor relief valves is operable in an automatic mode and manual mode, and wherein said means for producing said total capacity signal comprises: means responsive to the capacity and mode of each of the coolant vapor relief valves for producing an individual capacity signal for each of the valves which is in the automatic mode, said individual capacity signals each being indicative of the capacity of its corresponding coolant vapor relief valve; and means for summing said individual capacity signals to produce said total capacity signal.

10. The control subsystem of claim 9 in which the power generating system further includes a condenser operatively connected to the downstream side of the turbine and into which the coolant vapor relief valves divert coolant vapor, and wherein said means for producing said inhibit signal comprises:
  means responsive to said power signal and said capability signal for producing a capability-greater-than-power signal indicative of said capability signal being greater than said power signal;
  means for producing a condenser availability signal indicative of the condenser being available to accept coolant vapor diverted thereto; and
  means responsive to said capability-greater-than-power signal and said condenser availability signal for producing said inhibit signal only when said capability-greater-than-power signal and said condenser availability signal are present.

* * * * *